(12) United States Patent
Liu et al.

(10) Patent No.: US 8,596,252 B2
(45) Date of Patent: Dec. 3, 2013

(54) EMISSION CONTROL SYSTEM FOR AN ENGINE HAVING A TWO-STAGE TURBOCHARGER

(75) Inventors: Zhengbai Liu, Naperville, IL (US); Ning Lei, Oak Brook, IL (US); Jincai Zheng, Oak Park, IL (US); Robert L. Rowells, Elmwood Park, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 1064 days.

(21) Appl. No.: 12/612,384

(22) Filed: Nov. 4, 2009

(65) Prior Publication Data

US 2011/0100343 A1 May 5, 2011

(51) Int. Cl.
*F02B 33/44* (2006.01)
*F02D 23/00* (2006.01)

(52) U.S. Cl.
USPC ..................... 123/568.12; 60/605.2

(58) Field of Classification Search
USPC ............... 123/568.12, 568.21; 60/605.2, 602
See application file for complete search history.

(56) References Cited

U.S. PATENT DOCUMENTS

| | | | | |
|---|---|---|---|---|
| 6,324,846 B1 * | 12/2001 | Clarke | ..................... | 60/605.2 |
| 6,973,786 B1 * | 12/2005 | Liu et al. | ..................... | 60/605.2 |
| 7,469,691 B2 * | 12/2008 | Joergl et al. | ............. | 123/568.12 |
| 2004/0093866 A1 * | 5/2004 | Ishikawa | ..................... | 60/605.2 |
| 2007/0079614 A1 * | 4/2007 | Barbe et al. | ................ | 60/605.2 |

* cited by examiner

*Primary Examiner* — Stephen K Cronin
*Assistant Examiner* — Arnold Castro
(74) *Attorney, Agent, or Firm* — Jeffrey P. Calfa; Mark C. Bach

(57) ABSTRACT

While an engine (10, 10A, 10B, 10C, 10D, 10E) is operating, a control system (22) processes data for certain engine operating parameters to calculate a quantity of exhaust gas needed to satisfy an exhaust gas recirculation requirement. If a primary EGR control loop (34) alone can satisfy the calculated quantity of exhaust gas, a secondary EGR control loop (36) is closed while the primary EGR control loop is controlled to satisfy the calculated quantity. When the processing determines that the primary EGR control loop alone cannot satisfy the calculated quantity, the secondary EGR control loop is open concurrently with the primary EGR control loop and both the primary EGR loop and the secondary EGR loop are controlled to cause the combined flow of exhaust gas through the primary EGR control loop and flow of exhaust gas through the secondary EGR control loop to satisfy the calculated quantity.

10 Claims, 3 Drawing Sheets

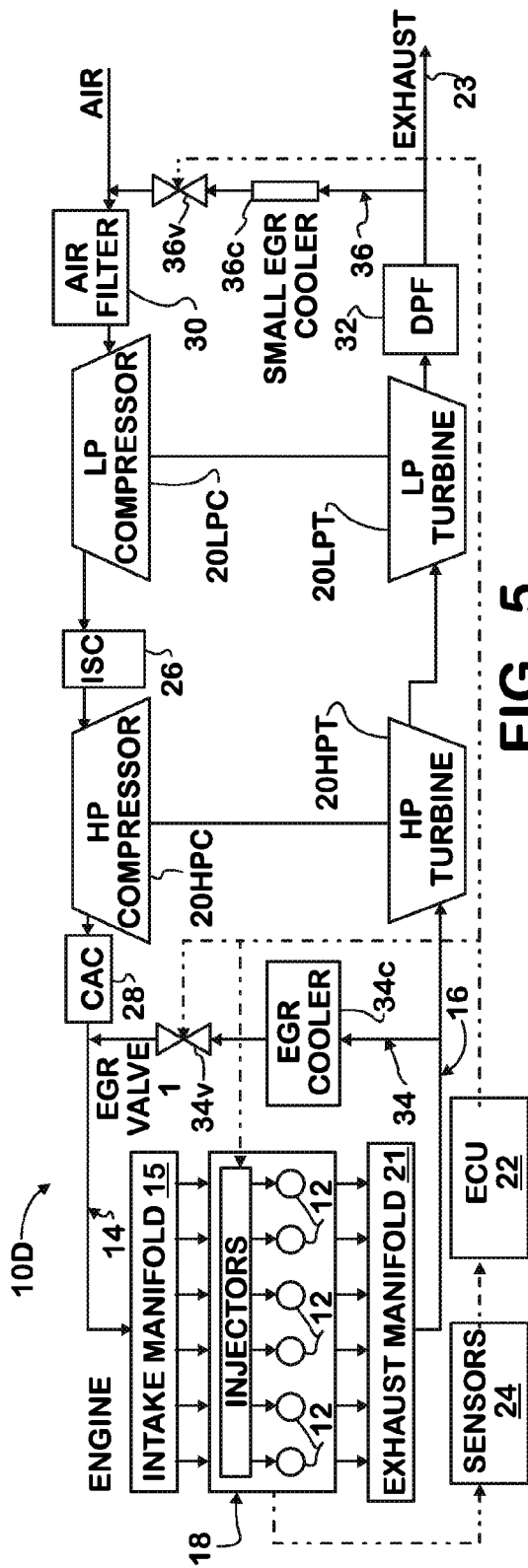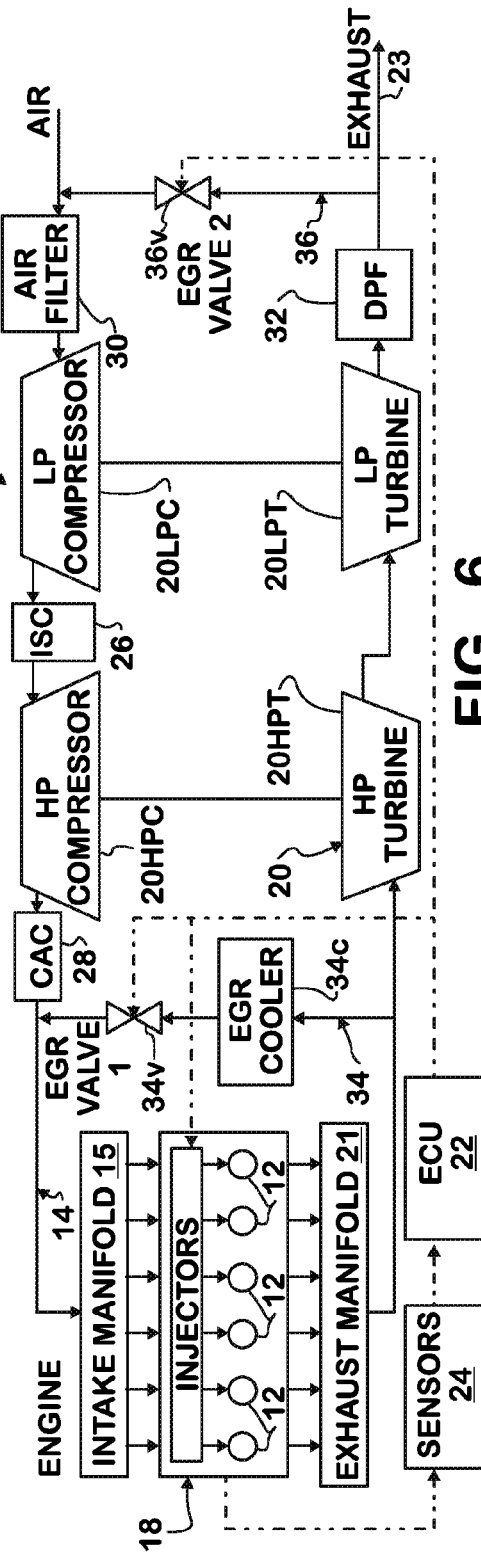
FIG. 5
FIG. 6

US 8,596,252 B2

EMISSION CONTROL SYSTEM FOR AN ENGINE HAVING A TWO-STAGE TURBOCHARGER

TECHNICAL FIELD

This disclosure relates to internal combustion engines, especially compression ignition (i.e. diesel) engines. More specifically, the disclosure relates to a system and method of exhaust gas recirculation for tailpipe emission control in a compression ignition engine that has a two-stage turbocharger.

BACKGROUND OF THE DISCLOSURE

The recirculation of some engine exhaust gas through an exhaust gas recirculation (EGR) loop to mix with charge air flow to the engine cylinders can aid in controlling tailpipe emissions, especially NOx (oxides of nitrogen) and particulates. Commercially acceptable diesel engine performance in a motor vehicle, especially a commercial vehicle, compels the use of supercharging. Hence, two-stage turbochargers find significant use in large vehicles powered by diesel engines. It is known to control EGR in such an engine through a high-pressure EGR loop in which some of the exhaust gas from the engine cylinders is diverted away from the high-pressure turbine stage of the turbocharger and recirculated through the high-pressure EGR loop to a mixer where it mixes with charge air coming from the high-pressure compressor stage that is being powered by the high-pressure turbine stage. The mixture of recirculated exhaust gas and charge air then passes into the intake manifold and eventually the engine cylinders.

Because a diesel engine that powers a motor vehicle runs at different speeds and loads depending on various inputs to both the vehicle and the engine that influence engine operation, exhaust gas recirculation requirements change with engine speed and load changes. A processor in an engine control system processes data indicative of parameters such as engine speed and engine load to develop control data for controlling various aspects of engine operation including the quantity of exhaust gas being recirculated.

While increasing the percentage of EGR (i.e. increasing the EGR rate) in the charge air can be effective to promote better reduction of such emissions, it is public knowledge that a majority of manufacturers of turbocharged diesel engines, possibly out of concern that certain engine operating conditions (for example, low engine speeds and high engine torques) may not provide sufficiently large EGR percentages, are pursuing tailpipe emission control strategies other than EGR control strategies in an effort to qualify engines for compliance with applicable governmental regulations for tailpipe emissions.

SUMMARY OF THE DISCLOSURE

One generic aspect of the present disclosure relates to a compression ignition engine comprising engine cylinders within which combustion occurs to operate the engine, an intake system for introducing charge air into the engine cylinders, a fueling system for introducing fuel into the engine cylinders to combust with the charge air, an exhaust system through which exhaust gas resulting from combustion of fuel in the engine cylinders exits, a turbocharger comprising a high-pressure turbine and a low-pressure turbine downstream of the high-pressure turbine through which exhaust gas exiting through the exhaust system successively passes and a low-pressure compressor operated by the low-pressure turbine and a high-pressure compressor downstream of the low-pressure compressor and operated by the high-pressure turbine through which air that has entered the intake system successively passes to create the charge air, a primary EGR control loop having a pierce point to the exhaust system upstream of the high-pressure turbine and a pierce point to the intake system downstream of the high-pressure compressor for conveying some of the exhaust gas to the intake system, a secondary EGR control loop having a pierce point to the exhaust system downstream of the high-pressure turbine and a pierce point to the intake system upstream of the high-pressure compressor for conveying some of the exhaust gas to the intake system; and control system for processing data for certain engine operating parameters while the engine is operating to calculate a quantity of exhaust gas needed to satisfy an exhaust gas recirculation requirement for the engine based on those engine operating parameters to determine if the primary EGR control loop alone can satisfy the calculated quantity of exhaust gas, for causing the secondary EGR control loop to be closed while the primary EGR loop is controlled to satisfy the calculated quantity of exhaust gas when the processing determines that the primary EGR control loop alone can satisfy the calculated quantity of exhaust gas, and for causing the secondary EGR control loop to be open concurrently with the primary EGR control loop and both the primary EGR loop and the secondary EGR loop controlled to cause the combined flow of exhaust gas through the primary EGR control loop and flow of exhaust gas through the secondary EGR control loop to satisfy the calculated quantity of exhaust gas when the processing determines that the primary EGR control loop alone cannot satisfy the calculated quantity of exhaust gas.

Another generic aspect of the disclosure relates to a method of exhaust emission control in a compression ignition engine that has engine cylinders within which combustion occurs to operate the engine, an intake system for introducing charge air into the engine cylinders, a fueling system for introducing fuel into the engine cylinders to combust with the charge air, an exhaust system through which exhaust gas resulting from combustion of fuel in the engine cylinders exits, and a turbocharger comprising a high-pressure turbine and a low-pressure turbine downstream of the high-pressure turbine through which exhaust gas exiting through the exhaust system successively passes and a low-pressure compressor operated by the low-pressure turbine and a high-pressure compressor downstream of the low-pressure compressor and operated by the high-pressure turbine through which air that has entered the intake system successively passes to create the charge air.

The method comprises: as the engine is operating, processing data for certain engine operating parameters to calculate a quantity of exhaust gas needed to satisfy an exhaust gas recirculation requirement for the engine based on those engine operating parameters to determine if a primary EGR control loop having a pierce point to the exhaust system upstream of the high-pressure turbine and a pierce point to the intake system downstream of the high-pressure compressor alone can satisfy the calculated quantity of exhaust gas, when the processing determines that the primary EGR control loop alone can satisfy the calculated quantity of exhaust gas, causing a secondary EGR control loop having a pierce point to the exhaust system downstream of the high-pressure turbine and a pierce point to the intake system upstream of the high-pressure compressor to be closed while controlling the primary EGR control loop to satisfy the calculated quantity, but when the processing determines that the primary EGR control loop alone cannot satisfy the calculated quantity of exhaust gas, causing the secondary EGR control loop to be open concurrently with the primary EGR control loop and controlling both the primary EGR control loop and the secondary EGR control loop to cause the combined flow of exhaust gas through the primary EGR control loop and flow of exhaust gas through the secondary EGR control loop to satisfy the calculated quantity of exhaust gas.

The foregoing summary, accompanied by further detail of the disclosure, will be presented in the Detailed Description below with reference to the following drawings that are part of this disclosure.

BRIEF DESCRIPTION OF THE DRAWINGS

FIG. 5 is a schematic diagram of portions of an exemplary diesel engine illustrative of a fifth disclosed embodiment.

FIG. 6 is a schematic diagram of portions of an exemplary diesel engine illustrative of a sixth disclosed embodiment.

DETAILED DESCRIPTION

Figure 1:
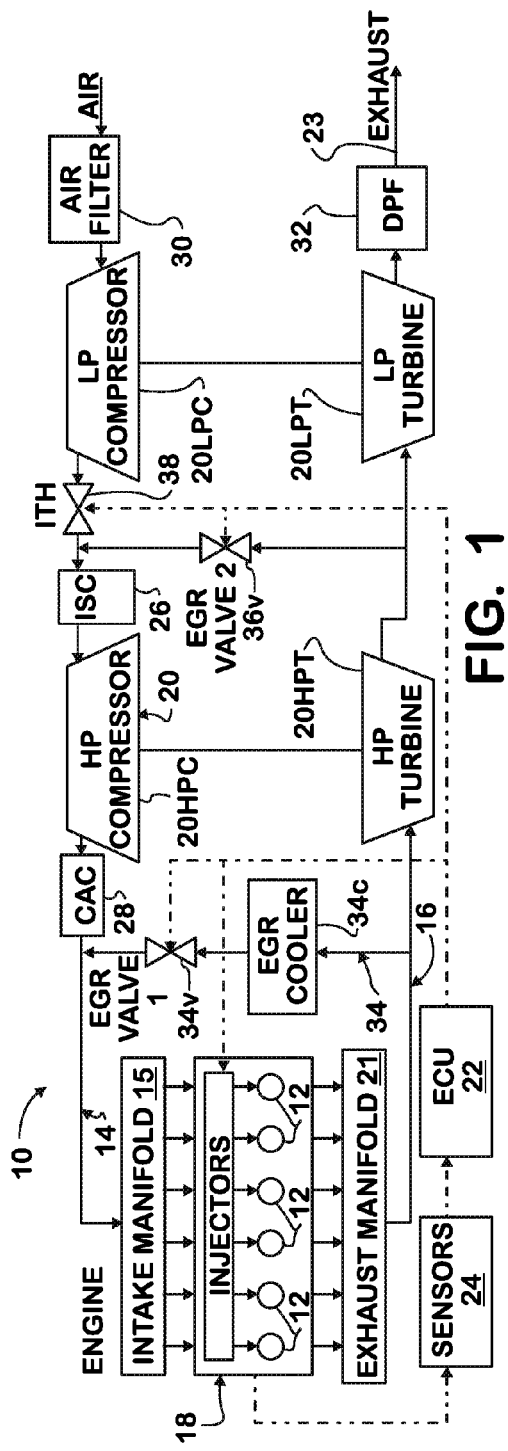
FIG. 1 is a schematic diagram of portions of an exemplary diesel engine illustrative of a first disclosed embodiment.

FIG. 1 shows a diesel engine 10 that comprises engine cylinders 12 within which pistons (not shown) reciprocate. Each piston is coupled to a respective throw of a crankshaft (not shown) by a corresponding connecting rod (not shown). Engine 10 further comprises an intake system 14 for introducing charge air into engine cylinders 12 through an intake manifold 15, an exhaust system 16 through which exhaust gas resulting from combustion of fuel in engine cylinders 12 exits, and a fueling system 18 comprising fuel injectors for introducing fuel into engine cylinders 12 to combust with the charge air.

A turbocharger 20 comprises a high-pressure turbine 20HPT and a low-pressure turbine 20LPT downstream of high-pressure turbine 20HPT through which exhaust gas coming from an exhaust manifold 21 successively passes as the exhaust gas passes through exhaust system 16 to a tailpipe 23. Exhaust gas heat operates the turbines.

Turbocharger 20 further comprises a low-pressure compressor 20LPC operated by low-pressure turbine 20LPT and a high-pressure compressor 20HPC downstream of low-pressure compressor 20LPC and operated by high-pressure turbine 20HPT. Air that has entered intake system 14 successively passes through low-pressure compressor 20LPC and high-pressure compressor 20HPC to create the charge air that is introduced into engine cylinders 12 via intake manifold 15.

Engine 10 also comprises a processor-based engine control system comprising an ECU (engine control unit) 22 that processes data from various sources to develop various control data for controlling various aspects of engine operation. The data processed by ECU 22 may originate at external sources, such as various sensors 24, and/or be generated internally. Examples of data processed may include engine speed, intake manifold pressure, exhaust manifold pressure, fuel injection pressure, fueling quantity and timing, mass airflow, and accelerator pedal position.

Intake system 14 further comprises an inter-stage cooler 26 between low-pressure compressor 20LPC and high-pressure compressor 20HPC and a charge air cooler 28 between high-pressure compressor 20HPC and intake manifold 15. The two coolers remove some of the heat of compression that would otherwise be present in the charge air. Charge air enters a respective engine cylinder from intake manifold 15 when a respective intake valve, or valves, is, or are, open during an engine cycle.

As engine 10 operates, intake system 14 draws in outside air through an air filter 30 that traps solid matter, such as dirt. Exhaust gas that leaves low-pressure turbine 20LPT passes through an after-treatment system that comprises an exhaust filter such as a diesel particulate filter 32 that traps particulate matter before the exhaust gas exits through tailpipe 23.

A primary EGR control loop 34 has a pierce point to exhaust system 16 upstream of high-pressure turbine 20HPT and a pierce point to intake system 14 downstream of charge air cooler 28, and therefore also downstream of high-pressure compressor 20HPC. Primary EGR control loop 34 comprises a primary EGR valve 34V under control of ECU 22 for controlling flow of exhaust gas through primary EGR control loop 34 and a primary EGR cooler 34C upstream of primary EGR valve 34V.

A secondary EGR control loop 36 has a pierce point to exhaust system 16 downstream of high-pressure turbine 20HPT and a pierce point to intake system 14 upstream of inter-stage cooler 26, and hence also upstream of high-pressure compressor 20HPC. Secondary EGR control loop 36 comprises a secondary EGR valve 36V under control of ECU 22 for controlling flow of exhaust gas through secondary EGR control loop 36.

Intake system 14 comprises a throttle valve 38 under control of ECU 22 for selectively throttling air flow from low-pressure compressor 20LPC to high-pressure compressor 20HPC. The pierce point of secondary EGR control loop 36 to intake system 14 is downstream of throttle valve 38 and upstream of inter-stage cooler 26.

ECU 22 processes data for certain engine operating parameters while the engine is operating to calculate a quantity of exhaust gas needed to satisfy an exhaust gas recirculation requirement for engine 10 based on those engine operating parameters to determine if primary EGR control loop 34 alone can satisfy the calculated quantity of exhaust gas. When the processing determines that primary EGR control loop 34 alone can satisfy the calculated quantity of exhaust gas, ECU 22 causing the secondary EGR control loop to be closed by keeping secondary EGR valve 36V closed while primary EGR loop 34 is controlled, by controlling primary EGR valve 34V, to satisfy the calculated quantity of exhaust gas.

When the processing determines that primary EGR control loop 34 alone cannot satisfy the calculated quantity of exhaust gas, ECU 22 opens secondary EGR valve 36V to cause secondary EGR control loop 36 to be open concurrently with primary EGR control loop 34 and controls both primary EGR loop 34 and secondary EGR loop 36 to cause the combined flow of exhaust gas through primary EGR control loop 34 and flow of exhaust gas through secondary EGR control loop 36 to satisfy the calculated quantity of exhaust gas. ECU 22 also controls the amount of throttling (if any is needed) of throttle valve 38 in coordination with the quantity of exhaust gas through secondary EGR control loop 36 to provide proper air-fuel ratio for engine 10.

Figure 2:
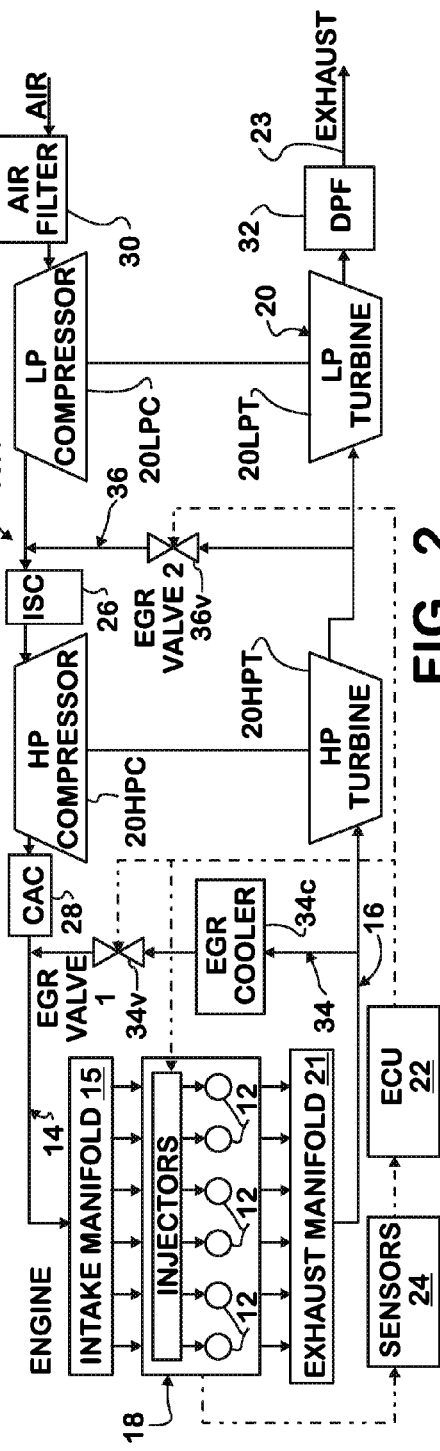
FIG. 2 is a schematic diagram of portions of an exemplary diesel engine illustrative of a second disclosed embodiment.

In engine 10A of FIG. 2, proper air-fuel ratio can be achieved without throttle valve 38, and so that Figure shows an engine that is like engine 10 except for the omission of throttle valve 38.

Figure 3:
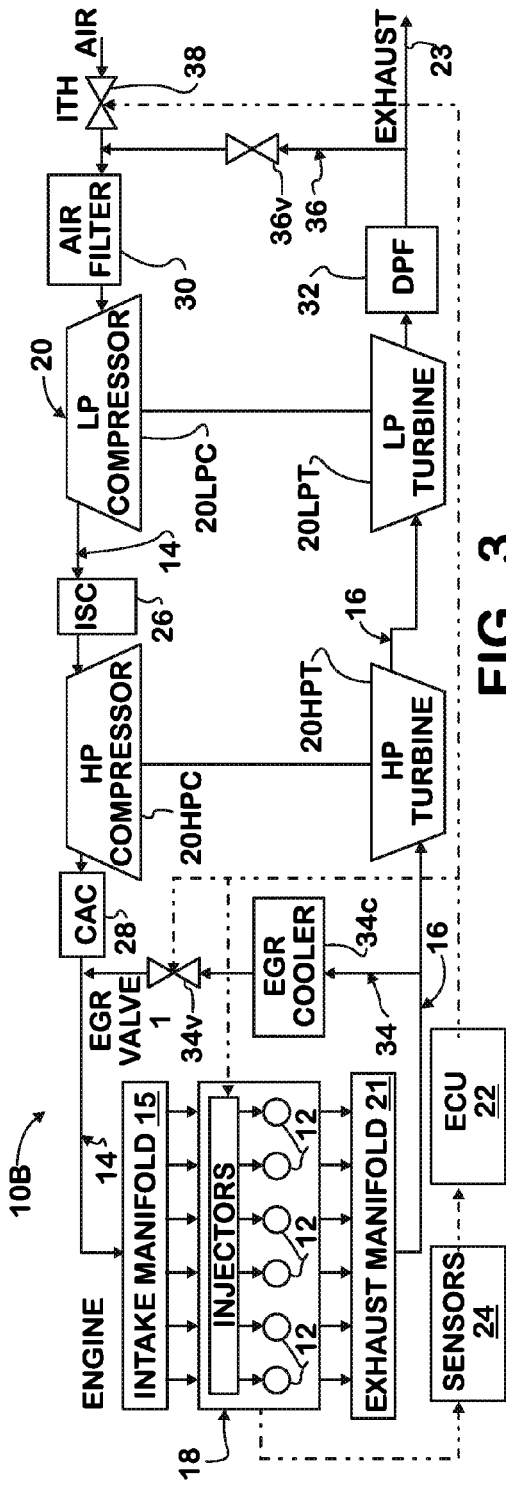
FIG. 3 is a schematic diagram of portions of an exemplary diesel engine illustrative of a third disclosed embodiment.

FIG. 3 shows an engine 10B that is like engine 10 of FIG. 1 except that secondary EGR control loop 36 is relocated to have its pierce point to exhaust system 16 downstream of diesel particulate filter 32, and hence downstream of low-pressure turbine 20LPT, and its pierce point to intake system 14 upstream of air filter 30, and hence upstream of low-pressure compressor 20LPC. Throttle valve 38 is upstream of the pierce point of secondary EGR control loop 36 to intake system 14 and remains under control of ECU 22 for selectively throttling flow of air that has entered intake system 14 before the air enters air filter 30.

Figure 4:
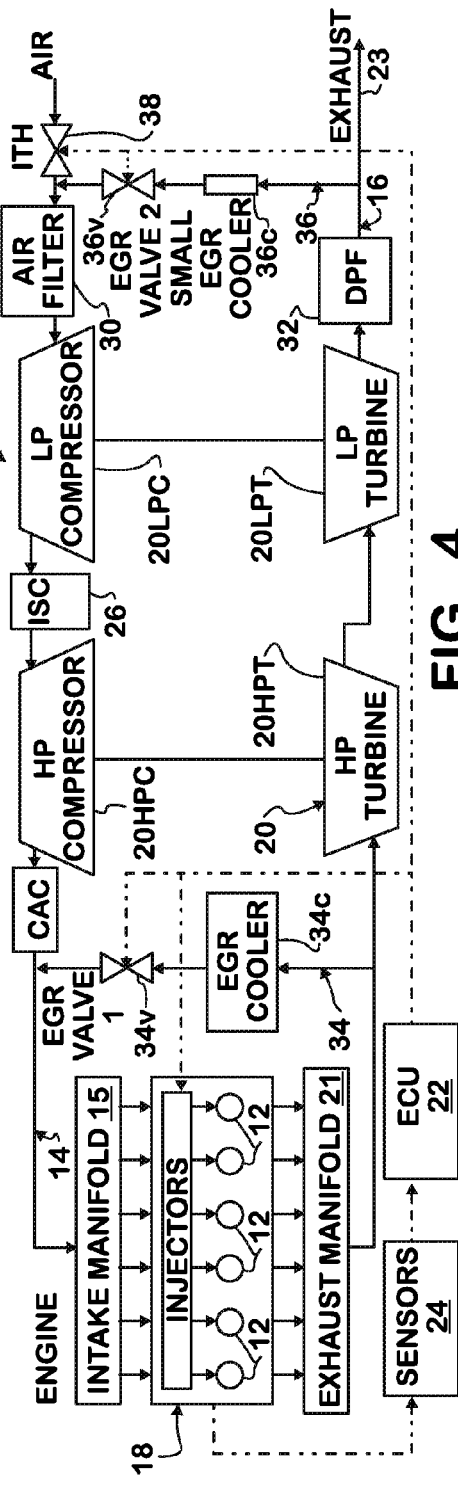
FIG. 4 is a schematic diagram of portions of an exemplary diesel engine illustrative of a fourth disclosed embodiment.

Engine 10C of FIG. 4 is like engine 10B except that secondary EGR control loop 36 comprises a secondary EGR cooler 36C upstream of secondary EGR valve 36V.

Engine 10D of FIG. 5 is like engine 10C except that throttle valve 38 is unnecessary for meeting this engine's EGR requirement and therefore omitted.

Engine 10E of FIG. 6 is like engine 10D except that secondary EGR cooler 36C is unnecessary for meeting this engine's EGR requirement and therefore omitted.

In the various engines, ECU 22 stores various electronic maps for control of the fuel injectors, throttle valve, and EGR valves, established for various operating conditions of the particular engine. ECU 22 receives the data about those conditions from sensors 24, and after processing the data, issues executive commands to the fuel injectors, an actuator of the throttle valve, and actuators of the EGR valves for causing proper fuel injection, proper EGR percentage, and proper air-fuel ratio based on the corresponding stored maps.

The disclosure has described a compression ignition engine (10, 10A, 10B, 10C, 10D, 10E) comprising: engine cylinders (12) within which combustion occurs to operate the engine; an intake system (14) for introducing charge air into the engine cylinders; a fueling system (18) for introducing fuel into the engine cylinders to combust with the charge air; an exhaust system (16) through which exhaust gas resulting from combustion of fuel in the engine cylinders exits; a turbocharger (20) comprising a high-pressure turbine (20HPT) and a low-pressure turbine (20LPT) downstream of the high-pressure turbine through which exhaust gas exiting through the exhaust system successively passes and a low-pressure compressor (20LPC) operated by the low-pressure turbine and a high-pressure compressor (20HPC) downstream of the low-pressure compressor and operated by the high-pressure turbine through which air that has entered the intake system successively passes to create the charge air; a primary EGR control loop (34) having a pierce point to the exhaust system upstream of the high-pressure turbine and a pierce point to the intake system downstream of the high-pressure compressor for conveying some of the exhaust gas to the intake system; a secondary EGR control loop (36) having a pierce point to the exhaust system downstream of the high-pressure turbine and a pierce point to the intake system upstream of the high-pressure compressor for conveying some of the exhaust gas to the intake system; and a control system (22, 24) for processing data for certain engine operating parameters while the engine is operating to calculate a quantity of exhaust gas needed to satisfy an exhaust gas recirculation requirement for the engine based on those engine operating parameters to determine if the primary EGR control loop alone can satisfy the calculated quantity of exhaust gas, for causing the secondary EGR control loop to be closed while the primary EGR loop is controlled to satisfy the calculated quantity of exhaust gas when the processing determines that the primary EGR control loop alone can satisfy the calculated quantity of exhaust gas, and for causing the secondary EGR control loop to be open concurrently with the primary EGR control loop and both the primary EGR loop and the secondary EGR loop controlled to cause the combined flow of exhaust gas through the primary EGR control loop and flow of exhaust gas through the secondary EGR control loop to satisfy the calculated quantity of exhaust gas when the processing determines that the primary EGR control loop alone cannot satisfy the calculated quantity of exhaust gas.

The disclosure has also described a compression ignition engine (10, 10A) in which the pierce point of the secondary EGR control loop to the exhaust system is upstream of the low-pressure turbine and the pierce point of the secondary EGR control loop to the intake system is downstream of the low-pressure compressor.

The disclosure has also described a compression ignition engine (10, 10A) in which the intake system comprises a cooler (26) having an inlet downstream of the pierce point of the secondary EGR control loop to the intake system and an outlet to the high-pressure compressor.

The disclosure has also described a compression ignition engine (10) in which the intake system comprises a throttle valve (38) under control of the control system for selectively throttling air flow from the low-pressure compressor to the high-pressure compressor, and the pierce point of the secondary EGR control loop to the intake system is downstream of the throttle valve and upstream of the cooler.

The disclosure has also described a compression ignition engine (10B, 10C, 10D, 10E) in which the pierce point of the secondary EGR control loop to the exhaust system is downstream of the low-pressure turbine and the pierce point of the secondary EGR control loop to the intake system is upstream of the low-pressure compressor.

The disclosure has also described a compression ignition engine (10B, 10C, 10D, 10E) in which the intake system comprises an air filter (30) for filtering air that has entered the intake system before the air passes to the low-pressure compressor, the exhaust system comprises an exhaust filter (32) for filtering exhaust gas from an outlet of the low-pressure turbine, the pierce point of the secondary EGR control loop to the intake system is upstream of the air filter, and the pierce point of the secondary EGR control loop to the exhaust system is downstream of the exhaust filter.

The disclosure has also described a compression ignition engine (10B, 10C) in which the intake system comprises a throttle valve (38) under control of the control system for selectively throttling flow of air that has entered the intake system before the air enters the air filter.

The disclosure has also described a compression ignition engine (10C, 10D) in which the secondary EGR control loop comprises a secondary EGR valve (36V) under control of the control system for controlling flow of exhaust gas through the secondary EGR control loop and a secondary EGR cooler (36C) upstream of the secondary EGR valve.

The disclosure has also described a compression ignition engine (10, 10A, 10B, 10C, 10D, 10E) in which the primary EGR control loop comprises a primary EGR valve (34V) under control of the control system for controlling flow of exhaust gas through the primary EGR control loop and a primary EGR cooler (34C) upstream of the primary EGR valve.

The disclosure has also described a compression ignition engine (10, 10A, 10B, 10C, 10D, 10E) in which the intake system comprises a charge air cooler (28) downstream of the high-pressure compressor, and the pierce point of the primary EGR control loop to the intake system is downstream of the charge air cooler.

The disclosure has also described a compression ignition engine (10, 10A, 10B, 10C, 10D, 10E) in which the intake system comprises an inter-stage cooler (26) through which air from the low-pressure compressor passes to the high-pressure compressor.

The disclosure has also described a compression ignition engine (10, 10B, 10C) in which the intake system comprises a throttle valve (38) under control of the control system for selectively throttling air upstream of the pierce point of the secondary EGR control loop to the intake system.

The disclosure has also described a method of exhaust emission control in a compression ignition engine (10, 10A, 10B, 10C, 10D, 10E) that has engine cylinders (12) within which combustion occurs to operate the engine, an intake system (14) for introducing charge air into the engine cylinders, a fueling system (18) for introducing fuel into the engine cylinders to combust with the charge air, an exhaust system (16) through which exhaust gas resulting from combustion of fuel in the engine cylinders exits, and a turbocharger (20) comprising a high-pressure turbine (20HPT) and a low-pressure turbine (20LPT) downstream of the high-pressure turbine through which exhaust gas exiting through the exhaust system successively passes and a low-pressure compressor (20LPC) operated by the low-pressure turbine and a high-pressure compressor (20HPC) downstream of the low-pressure compressor and operated by the high-pressure turbine through which air that has entered the intake system successively passes to create the charge air, the method comprising: as the engine is operating, processing data for certain engine operating parameters to calculate a quantity of exhaust gas needed to satisfy an exhaust gas recirculation requirement for the engine based on those engine operating parameters to determine if a primary EGR control loop (34) having a pierce point to the exhaust system upstream of the high-pressure turbine and a pierce point to the intake system downstream of the high-pressure compressor alone can satisfy the calculated quantity of exhaust gas, when the processing determines that the primary EGR control loop alone can satisfy the calculated quantity of exhaust gas, causing a secondary EGR control loop (36) having a pierce point to the exhaust system downstream of the high-pressure turbine and a pierce point to the intake system upstream of the high-pressure compressor to be closed while controlling the primary EGR control loop to satisfy the calculated quantity, but when the processing determines that the primary EGR control loop alone cannot satisfy the calculated quantity of exhaust gas, causing the secondary EGR control loop to be open concurrently with the primary EGR control loop and controlling both the primary EGR control loop and the secondary EGR control loop to cause the combined flow of exhaust gas through the primary EGR control loop and flow of exhaust gas through the secondary EGR control loop to satisfy the calculated quantity of exhaust gas.

The disclosure has also described a method of exhaust emission control in a compression ignition engine (10, 10A) in which the step of causing the secondary EGR control loop to be open concurrently with the primary EGR control loop and controlling both the primary EGR control loop and the secondary EGR control loop to cause the combined flow of exhaust gas through the primary EGR control loop and flow of exhaust gas through the secondary EGR control loop to satisfy the calculated quantity of exhaust gas comprises causing flow through the secondary EGR control loop to occur from a pierce point to the exhaust system that is upstream of the low-pressure turbine to a pierce point to the intake system that is downstream of the low-pressure compressor.

The disclosure has also described a method of exhaust emission control in a compression ignition engine (10, 10A) comprising causing both air that has entered the intake system and exhaust gas that has entered the intake system from the secondary EGR control loop to pass through a cooler (26) that has an outlet to the high-pressure compressor.

The disclosure has also described a method of exhaust emission control in a compression ignition engine (10) comprising selectively throttling air that has entered the intake system at a location upstream of the pierce point of the secondary EGR control loop to the intake system.

The disclosure has also described a method of exhaust emission control in a compression ignition engine (10B, 10C, 10D, 10E) in which the step of causing the secondary EGR control loop to be open concurrently with the primary EGR control loop and controlling both the primary EGR control loop and the secondary EGR control loop to cause the combined flow of exhaust gas through the primary EGR control loop and flow of exhaust gas through the secondary EGR control loop to satisfy the calculated quantity of exhaust gas comprises causing flow through the secondary EGR control loop to occur from a pierce point to the exhaust system that is downstream of the low-pressure turbine and a pierce point to the intake system is upstream of the low-pressure compressor.

The disclosure has also described a method of exhaust emission control in a compression ignition engine (10B, 10C, 10D, 10E) comprising filtering air that has entered the intake system before the air passes to the low-pressure compressor, filtering exhaust gas coming from an outlet of the low-pressure turbine, and causing exhaust gas to pass through the secondary EGR control loop from a pierce point to the exhaust system that is downstream of the exhaust filter to a pierce point to the intake system that is upstream of the air filter.

The disclosure has also described a method of exhaust emission control in a compression ignition engine (10B, 10C) comprising selectively throttling flow of air that has entered the intake system before the air passes to the air filter.

The disclosure has also described a method of exhaust emission control in a compression ignition engine (10C, 10D) comprising controlling flow of exhaust gas through the secondary EGR control loop by controlling a secondary EGR valve (36V) in the secondary EGR control loop, and causing flow of exhaust gas through the secondary EGR control loop to flow through a secondary EGR cooler (36C) in the secondary EGR control loop that is upstream of the secondary EGR valve.

The disclosure has also described a method of exhaust emission control in a compression ignition engine (10, 10A, 10B, 10C, 10D, 10E) comprising controlling flow of exhaust gas through the primary EGR control loop by controlling a primary EGR valve (34V) in the primary EGR control loop and causing flow of exhaust gas through the primary EGR control loop to flow through a primary EGR cooler (34C) in the primary EGR control loop that is upstream of the primary EGR valve.

The disclosure has also described a method of exhaust emission control in a compression ignition engine (10, 10A, 10B, 10C, 10D, 10E) comprising introducing exhaust gas from the primary EGR control loop into the intake system downstream of a charge air cooler (28) that is downstream of the high-pressure compressor.

The disclosure has also described a method of exhaust emission control in a compression ignition engine (10, 10A, 10B, 10C, 10D, 10E) comprising causing air from the low-pressure compressor to pass through an inter-stage cooler (26) before entering the high-pressure compressor.

The disclosure has also described a method of exhaust emission control in a compression ignition engine (10, 10B, 10C) comprising selectively throttling air that has entered the intake system upstream of the pierce point of the secondary EGR control loop to the intake system.

What is claimed is:

1. A compression ignition engine comprising:
engine cylinders within which combustion occurs to operate the engine;
an intake system for introducing charge air into the engine cylinders;
a fueling system for introducing fuel into the engine cylinders to combust with the charge air;
an exhaust system through which exhaust gas resulting from combustion of fuel in the engine cylinders exits;
a turbocharger comprising a high-pressure turbine and a low-pressure turbine downstream of the high-pressure turbine through which exhaust gas exiting through the exhaust system successively passes and a low-pressure compressor operated by the low-pressure turbine and a high-pressure compressor downstream of the low-pressure compressor and operated by the high-pressure turbine through which air that has entered the intake system successively passes to create the charge air;
a primary EGR control loop having a pierce point to the exhaust system upstream of the high-pressure turbine and a pierce point to the intake system downstream of the high-pressure compressor for conveying some of the exhaust gas to the intake system;
a secondary EGR control loop having a pierce point to the exhaust system downstream of the high-pressure turbine and a pierce point to the intake system upstream of the high-pressure compressor for conveying some of the exhaust gas to the intake system;
a control system for processing data for certain engine operating parameters while the engine is operating to calculate a quantity of exhaust gas needed to satisfy an exhaust gas recirculation requirement for the engine based on those engine operating parameters to determine if the primary EGR control loop alone can satisfy the calculated quantity of exhaust gas, for causing the secondary EGR control loop to be closed while the primary EGR loop is controlled to satisfy the calculated quantity of exhaust gas when the processing determines that the primary EGR control loop alone can satisfy the calculated quantity of exhaust gas, and for causing the secondary EGR control loop to be open concurrently with the primary EGR control loop and both the primary EGR loop and the secondary EGR loop controlled to cause the combined flow of exhaust gas through the primary EGR control loop and flow of exhaust gas through the secondary EGR control loop to satisfy the calculated quantity of exhaust gas when the processing determines that the primary EGR control loop alone cannot satisfy the calculated quantity of exhaust gas, wherein the pierce point of the secondary EGR control loop to the exhaust system is upstream of the low-pressure turbine and the pierce point of the secondary EGR control loop to the intake system is downstream of the low-pressure compressor, the intake system comprises a cooler having an inlet downstream of the pierce point of the secondary EGR control loop to the intake system and an outlet to the high-pressure compressor and the intake system comprises a throttle valve under control of the control system for selectively throttling air flow from the low-pressure compressor to the high-pressure compressor, and the pierce point of the secondary EGR control loop to the intake system is downstream of the throttle valve and upstream of the cooler.

2. A compression ignition engine as set forth in claim 1 in which the primary EGR control loop comprises a primary EGR valve under control of the control system for controlling flow of exhaust gas through the primary EGR control loop and a primary EGR cooler upstream of the primary EGR valve.

3. A compression ignition engine as set forth in claim 2 in which the intake system comprises a charge air cooler downstream of the high-pressure compressor, and the pierce point of the primary EGR control loop to the intake system is downstream of the charge air cooler.

4. A compression ignition engine as set forth in claim 3 in which the intake system comprises an inter-stage cooler through which air from the low-pressure compressor passes to the high-pressure compressor.

5. A method of exhaust emission control in a compression ignition engine that has engine cylinders within which combustion occurs to operate the engine, an intake system for introducing charge air into the engine cylinders, a fueling system for introducing fuel into the engine cylinders to combust with the charge air, an exhaust system through which exhaust gas resulting from combustion of fuel in the engine cylinders exits, and a turbocharger comprising a high-pressure turbine and a low-pressure turbine downstream of the high-pressure turbine through which exhaust gas exiting through the exhaust system successively passes and a low-pressure compressor operated by the low-pressure turbine and a high-pressure compressor downstream of the low-pressure compressor and operated by the high-pressure turbine through which air that has entered the intake system successively passes to create the charge air, the method comprising:
as the engine is operating, processing data for certain engine operating parameters to calculate a quantity of exhaust gas needed to satisfy an exhaust gas recirculation requirement for the engine based on those engine operating parameters to determine if a primary EGR control loop having a pierce point to the exhaust system upstream of the high-pressure turbine and a pierce point to the intake system downstream of the high-pressure compressor alone can satisfy the calculated quantity of exhaust gas, when the processing determines that the primary EGR control loop alone can satisfy the calculated quantity of exhaust gas, causing a secondary EGR control loop having a pierce point to the exhaust system downstream of the high-pressure turbine and a pierce point to the intake system upstream of the high-pressure compressor to be closed while controlling the primary EGR control loop to satisfy the calculated quantity, but when the processing determines that the primary EGR control loop alone cannot satisfy the calculated quantity of exhaust gas, causing the secondary EGR control loop to be open concurrently with the primary EGR control loop and controlling both the primary EGR control loop and the secondary EGR control loop to cause the combined flow of exhaust gas through the primary EGR control loop and flow of exhaust gas through the secondary EGR control loop to satisfy the calculated quantity of exhaust gas, wherein the step of causing the secondary EGR control loop to be open concurrently with the primary EGR control loop and controlling both the primary EGR control loop and the secondary EGR control loop to cause the combined flow of exhaust gas through the primary EGR control loop and flow of exhaust gas through the secondary EGR control loop to satisfy the calculated quantity of exhaust gas comprises causing flow through the secondary EGR control loop to occur from a pierce point to the exhaust system that is upstream of the low-pressure turbine to a pierce point to the intake system that is downstream of the low-pressure compressor, causing both air that has entered the intake system and exhaust gas that has entered the intake system from the secondary EGR control loop to pass through a cooler that has an outlet to the high-pressure compressor, and selectively throttling air that has entered the intake system at a location upstream of the pierce point of the secondary EGR control loop to the intake system.

6. A method as set forth in claim 5 comprising controlling flow of exhaust gas through the primary EGR control loop by controlling a primary EGR valve in the primary EGR control loop and causing flow of exhaust gas through the primary EGR control loop to flow through a primary EGR cooler in the primary EGR control loop that is upstream of the primary EGR valve.

7. A method as set forth in claim 6 comprising introducing exhaust gas from the primary EGR control loop into the intake system downstream of a charge air cooler that is downstream of the high-pressure compressor.

8. A method as set forth in claim 7 comprising causing air from the low-pressure compressor to pass through an interstage cooler before entering the high-pressure compressor.

9. A method as set forth in claim 8 comprising selectively throttling air that has entered the intake system upstream of the pierce point of the secondary EGR control loop to the intake system.

10. A method as set forth in claim 8 comprising controlling flow of exhaust gas through the secondary EGR control loop by controlling a secondary EGR valve in the secondary EGR control loop.

\* \* \* \* \*